Figure 1:
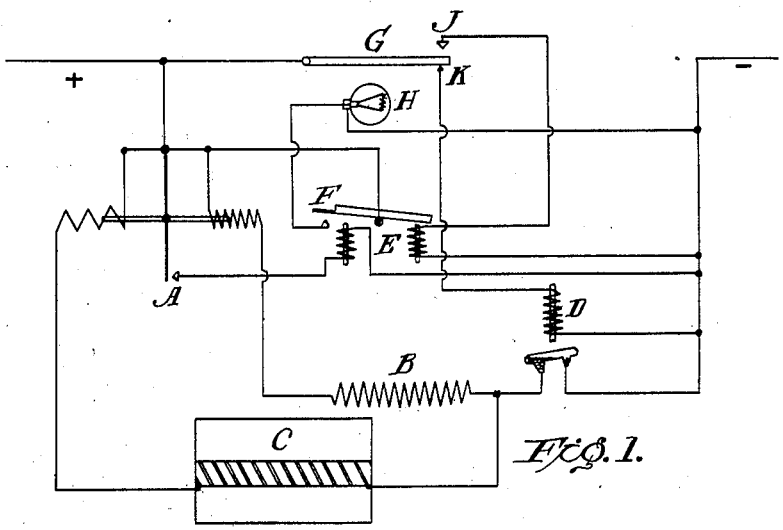

E. HAAGN.
HEAT REGULATING SYSTEM.
APPLICATION FILED JULY 8, 1915.

1,183,814. Patented May 16, 1916.

Witnesses
G. T. Baker.
H. P. Jennings.

Inventor
Ernst Haagn
by Foster Freeman Watson & Coit
Attorneys

UNITED STATES PATENT OFFICE.

ERNST HAAGN, OF HANAU-ON-THE-MAIN, GERMANY, ASSIGNOR TO THE FIRM OF W. C. HERAEUS, GESELLSCHAFT MIT BESCHRÄNKTER HAFTUNG, OF HANAU-ON-THE-MAIN, GERMANY.

HEAT-REGULATING SYSTEM.

1,183,814.

Specification of Letters Patent. Patented May 16, 1916.

Application filed July 8, 1915. Serial No. 38,789.

*To all whom it may concern:*

Be it known that I, ERNST HAAGN, a subject of the German Emperor, and resident of Hanau-on-the-Main, Germany have invented certain new and useful Improvements in Heat-Regulating Systems, of which the following is a specification.

My invention relates to the automatic regulation, by means of the electric current, of temperature either in a room provided with a heating stove or else within a stove or furnace itself, the object in view being to keep the temperature within the room or furnace substantially constant.

Till now in all electric systems of this kind, whenever the desired temperature was attained, the source of heat was cut out altogether or its heating effect was diminished, to be brought to full action as soon as a certain minimum temperature had been reached. In order to effect this a device influenced by temperature is required, such device acting upon the regulating devices proper either directly or indirectly.

In the case of high temperatures only the electric thermometers (either Le Chatelier's pyrometer or a resistance thermometer) can be used, all other instruments having proved not to be reliable enough. The cutting in and out of the source of heat is effected in this case by actuating an electric contact. Now it has proved to be very difficult to design relays which will effect the cutting out, whenever the temperature is sinking, as promptly as the cutting in, when the temperature rises a certain amount of energy being required for opening the contacts owing to the action of residual magnetism. In order to overcome these difficulties, the present invention employs a different principle for maintaining the temperature constant. When the desired furnace temperature is exceeded a control circuit is closed automatically by electric means in a manner to be more fully described hereinafter. The closing of the circuit causes the operation of an automatic arrangement which interrupts the heating of the furnace and the control circuit is opened after the expiration of a period of time. This automatic arrangement is referred to in the following description merely as a "periodic switch", by which is meant not only clockwork or any other automatically acting apparatus operated for a predetermined time but other automatically acting devices which are set in operation after a more or less long period for a short time. The interval or period of time during which the periodic switch operates is not calculated to fractions of seconds, but under certain conditions may vary according to the circumstances. The periodic switch is controlled only by the operation of a relay which controls a circuit in no way influenced by the furnace. The periodic switch causes the heating current to be cut off, and the heating current is turned on again after the expiration of a period of time, which periods of time are selected small enough to prevent the furnace temperature from going too low. In this method of operation the windings of the relays are completely deënergized when the heating current is turned off whereby materially greater power is available for interrupting the circuit than in those constructions where an ordinary relay depends on comparatively small variations in current or voltage.

The electrical energization of the circuit which controls the periodic switch appears in simple form in the case of electric resistance furnaces having a high coefficient of temperature, since the variation of the heat resistance can directly influence the current, voltage, or differential relays. In the case of resistance furnaces with a very low coefficient of temperature, however, or furnaces which are heated by gas, steam or coal, a resistance thermometer is employed for controlling the temperature, the current and voltage variations of the resistance thermometer influencing the relays.

In the drawings three modifications of the invention are illustrated.

Figure 2:
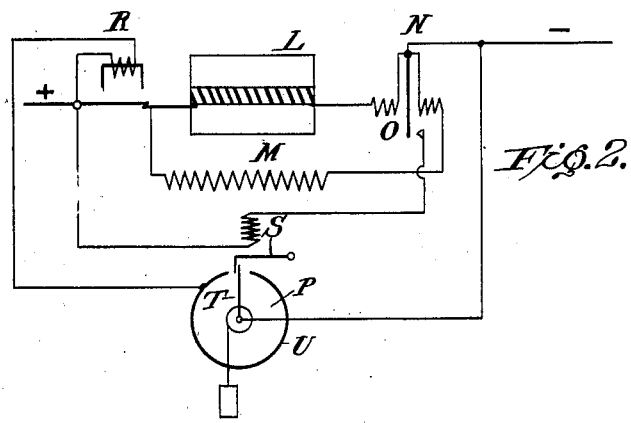
Figure 3:
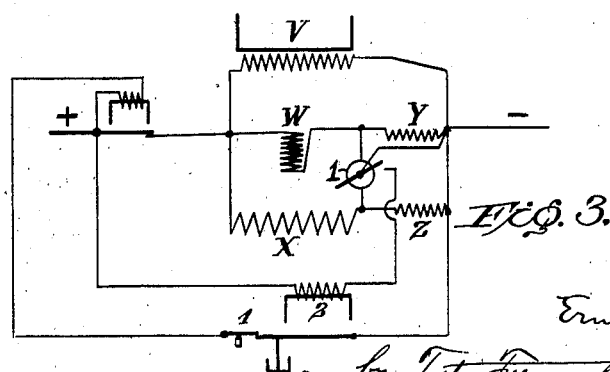

Figure 1 represents a resistance furnace having a high coefficient of temperature and equipped with a special form of periodic switch. Fig. 2 represents a similar resistance heater or furnace equipped with a mechanical periodic switch; and Fig. 3 represents a resistance heater having a low coefficient of temperature and provided with a resistance thermometer and a periodic switch dampened by air pressure but the furnace in this system may be heated by some other heating medium such as gas, steam or coal.

The new system lends itself with advantage to the regulation of electric resistance furnaces. In such a furnace the variations of the heating resistance itself may be used for regulating the temperature. In applying the new system to furnaces heated with coal or gas a resistance thermometer is inserted, the variations in the resistance of said thermometer being caused to actuate the regulator proper cutting out or weakening the source of heat. In this latter case however, a certain retardation of the regulation is unavoidable owing to the slow transmission of heat from the furnace to the thermometer, while in the case of an electric furnace the regulation is effected directly by the heated part of the furnace.

In the drawings annexed to this specification the system of thermic regulation is represented in three modifications.

In the modification shown in Fig. 1 a periodic switch is employed, the principal part of which consists of an element which is heated up to a certain temperature by a weak current and cut off, after the predetermined temperature has been reached, so as to cool down again. After being cooled down to a certain temperature the main circuit is closed once more, the time required being variable in accordance with the capacity for heat of the element in question. A very simple arrangement of this sort requiring from 10 to 30 seconds for the cutting out and being therefore especially suited for small laboratory furnaces is a composite metal spring composed of metals having different coefficients of expansion and heated by a small glow lamp so as to be bent to a certain degree, the glow lamp being then cut out of the circuit. The spring upon cooling will then resume its initial position and thereby close the main circuit.

Referring to Fig. 1, A is a differential relay, B is the constant resistance, C is the furnace, D is a mercury circuit breaker, E is a reversible switch with two coils, F is the contact opened and closed by said switch, G is the composite spring, H is a glow lamp, J and K are contacts opened and closed by the spring. This arrangement acts as follows: the circuit breaker D closes the circuit of B and C whenever the current passes through its coil. When the current in the furnace has sunk, owing to the heating, so far that the effect of the current flowing through B predominates, the contact of the differential relay A is closed and the current now passes through the left hand coil of relay E. The coil attracts its armature and closes contact F, thereby cutting in the glow lamp H. The spring G heated by the lamp is bent upward, thus opening contact K and thereby causing circuit breaker D to open the main circuit as well as contact A. The glow lamp is constantly cut in, the armature of relay E being in such a position as to keep contact F closed. By being heated further, spring G is bent further until contact J is closed. This causes the right hand coil of relay E to be cut in, the armature to be reversed, contact F to be opened and the lamp to be cut out. The spring G in cooling down will now resume its initial shape and in doing so closes contact K, thereby cutting in circuit breaker D and starting the cycle afresh.

In Fig. 2 a modification is illustrated in which a mechanically driven periodic switch is employed in place of the electro-thermal periodic switch shown in Fig. 1. Referring to the drawings, L is the electric furnace, M is a high resistance connected in parallel with the furnace, N is a differential relay with an armature influenced by two coils, O is a contact closed whenever the current flowing through M predominates. P is a periodic switch of suitable construction, R is a magnetic switch operated during a certain space of time by the periodic switch P, whenever contact O is closed, and opening the main circuit L M N. The operation of this arrangement is as follows: With a positive temperature-coefficient the current passing through L will be the weaker, the higher the temperature in the furnace. In accordance with the resistance of M the armature of relay N will be attracted at a certain temperature, until contact O is closed. This causes pawl S of the periodic switch to be withdrawn, thus releasing the lever T which will now travel around. Lever T is suitably damped and requires a certain space of time, depending upon the cooling conditions of the furnaces, for completing its course. During its travel it is in contact with the contact ring U, and a circuit is thereby closed, which operates the switch R and thereby opens the main circuit, thus causing the circuit through contact O to be interrupted. When the lever T has nearly completed its circular course, it leaves the contact ring and is then stopped by the pawl S. The magnetic circuit of switch R is interrupted and the main circuit is closed again. Only after the predetermined temperature has been reached again, the periodic switch resumes its operation.

Fig. 3 illustrates the application of a resistance thermometer W to indicate the temperature of the electrically heated furnace V. The thermometer is used as the fourth branch in the Wheatstone bridge arrangement X Y Z, which includes the galvanometer or polarized relay 1. Referring to the drawings, V is the furnace; the differential relay is here replaced by a bridge formed by four arms W, X, Y, Z dimensioned according to the temperature to be regulated. 1 is a polarized relay, 2 is a periodic switch of some suitable type provided with a damping device 3 allowing its armature to fall off only slowly. 4 is a contact normally open and closed upon the periodic switch being actuated, until the armature of the switch has slowly returned to its position of rest. The operation of this arrangement closely resembles the operation of the device described before.

I wish it to be understood that any suitable type of periodic switch may be used in connection with the new system herein disclosed.

I claim:—

1. In an electric system for regulating the temperature of furnaces and the like the combination with heating means and electric means for regulating the heating effect of said heating means, of an automatically operating switch having a retarded action and adapted to influence said regulating means during an extended interval of time, after a predetermined temperature has been reached.

2. In an electric system for regulating the temperature of furnaces and the like the combination with heating means and electric means for regulating the heating effect of said heating means, of a periodic switch having a retarded action and adapted to influence said regulating means during an extended interval of time, after a predetermined temperature has been reached, and electric means for actuating said periodic switch.

3. In an electric system for regulating the temperature of furnaces and the like the combination with heating means and electric means for regulating the heating effect of said heating means, of a periodic switch, adapted to influence said regulating means during an interval of time, after a predetermined temperature has been reached, said periodic switch being influenced by heat, and electric means for heating said switch.

4. In an electric system for regulating the temperature of furnaces and the like the combination with heating means and electric means for regulating the heating effect of said heating means, of a composite contact spring adapted to open and close the circuit of said regulating means, and an electric glow lamp placed in said circuit and adapted to heat said spring.

5. In an electric system for regulating the temperature of furnaces and the like, the combination of heating means, electric means for regulating the heating effect of said heating means comprising an electric control circuit including a relay, a second circuit controlled by said relay and including a switch controlling means, a switch operating in response to the action of said switch controlling means, and a circuit controlled by said switch and including means for causing a change in the heating effect of the heating means.

6. In an electric system for regulating the temperature of furnaces and the like, the combination of heating means, electric means for regulating the heating means comprising an electric control circuit including a relay and a circuit closing device operated by said relay when a predetermined temperature has been reached by said heating means, a second circuit controlled by said circuit closing device, and a switch controlled by said second circuit, said switch being arranged to influence said regulating means for an interval of time after a predetermined temperature has been reached by said heating means.

7. In an electric system for regulating the temperature of furnaces and the like, the combination of heating means, electric means for regulating the heating effect of said heating means, an automatically acting switch having a retarded action and rendered operative when a predetermined temperature is reached by said heating means, and means whereby said switch controls said regulating means for an extended interval of time after the predetermined temperature has been reached.

In testimony whereof I have signed my name to this specification in the presence of two subscribing witnesses.

ERNST HAAGN.

Witnesses:
　JEAN GRUND,
　CARL GRUND.